United States Patent

Allen et al.

[11] 3,948,024
[45] Apr. 6, 1976

[54] IMPLEMENT POSITION CONTROL SYSTEM

[75] Inventors: David Thomas Allen; Robert Nick Behrens, both of Horicon, Wis.

[73] Assignee: Deere & Company, Moline, Ill.

[22] Filed: Sept. 20, 1974

[21] Appl. No.: 507,926

[52] U.S. Cl. .................. 56/11.2; 56/10.7; 318/293
[51] Int. Cl.² ........................................ A01D 75/14
[58] Field of Search ......... 56/10.6, 10.7, 11.2, 14.9, 56/17.1; 318/293; 254/98

[56] References Cited
UNITED STATES PATENTS

| | | | |
|---|---|---|---|
| 2,922,929 | 1/1960 | Cooper et al. | 318/293 X |
| 3,305,718 | 2/1967 | Waldron | 318/293 X |
| 3,396,519 | 8/1968 | Lehman | 56/11.2 |

Primary Examiner—Louis G. Mancene
Assistant Examiner—J. N. Eskovitz

[57] ABSTRACT

An electric motor-powered linkage is provided for raising and lowering an implement mounted on a lawn and garden tractor. The energization of the motor and preselection of the position to which it is desired that the motor move the implement is accomplished through means of a control system including a pair of side-by-side arms pivotally mounted for swinging movement about a common axis. On one arm is mounted first and second normally open control switches forming part of a control circuit connected to a motor-reversing power circuit, and on the other arm is mounted a cam forming part of a follow-up linkage. To selectively actuate the motor to drive in forward and reverse, the arm on which the control switches are mounted is selectively manually swung in opposite first and second directions to cause the first and second switches to be respectively actuated to closed positions by first and second arcuate surfaces of the cam. The follow-up linkage acts in response to motor actuation to return the cam to a position wherein the surfaces thereof permit whichever one of the switches is actuated to return to its normally open position to thus de-energize the motor. The cam surfaces are elongated in the direction of movement of the switches so that the distance through which the motor must move the implement in order to effect deenergization of the motor may be preselected by the amount that the switch carrying arm is manually displaced.

9 Claims, 7 Drawing Figures

IMPLEMENT POSITION CONTROL SYSTEM

BACKGROUND OF THE INVENTION

The present invention relates to improvements in a control system for an electric motor-powered linkage, including a follow-up linkage, for moving a tractor-mounted implement to preselected positions relative to a support therefor.

The operation of tractor-mounted implements such as mowers, scraper blades, rotary tillers and the like often requires the implement to be frequently moved between transport and working positions. In order to insure that the work performed by the implement will be consistent over any given area, it is necessary for the implement to be moved to the same working position.

While the prior art includes many control systems for controlling a powered linkage for moving a remote element to a preselected position, many of these control systems are not designed to permit an infinite selection of positions within a range of movement of the element and others of the control systems are relatively complex and/or cumbersome.

SUMMARY OF THE INVENTION

According to the present invention, an improved implement positioning system is provided for effecting the movement of an implement among an infinite number of desired positions. More specifically, the control system provides a motor control circuit including a power circuit which is selectively energized through manually controllable switches located in the control circuit to effect energization of the power circuit to selectively cause forward or reverse driving conditions in the motor, the switches also being controlled through means of a follow-up linkage to effect de-energization of the power circuit to cause de-energization of the electric motor.

A broad object of the invention is to provide an electromechanical control system which is compact and designed to function reliably with respect to the positioning of a controlled element to an infinite number of positions within a given range. A more specific object is to provide such a control system which includes electrical circuitry for controlling the electric motor and having a control circuit portion including first and second normally open switches which are easily and effectively actuated through means of a cam so as to control the energization and de-energization of a power circuit for the electric motor. More specifically, it is an object to provide a manual input linkage including a first support member on which the two control switches are mounted and to provide a follow-up linkage including a second support member on which the cam is mounted, the first and second support members being respectively moved relative to each other to effect actuation of the control switches.

Another feature of the invention is in the provision of a motor power circuit including motor-reversing switch means in the form of four solenoid-operated switches.

Another object of the invention is to provide an easily adjustable stop means for engaging the manual input linkage so as to stop the movement of the switch-carrying first member at a preselected position when moved in a first direction relative to the cam-carrying second member for actuating one of the control switches for causing the electric motor to be actuated to drive in a first direction to move the controlled element to a preselected position, the follow-up linkage then acting to return the cam-carrying second member to a position wherein the cam permits the closed control switch to move to its normal open position.

Yet another feature of the invention is to provide a control system having a majority of its components mounted in a relatively compact fashion on a pedestal or plate.

Yet another feature of the invention is to provide an adjustable stop means located so as to become engaged by the manually controllable linkage when a reciprocably driven member coupled to the electric motor reaches the end of its stroke so that the motor cannot be further actuated by the manual control linkage to attempt to move the controlled implement or element to a position to which it is impossible to be driven by the motor.

These and other objects will become apparent from a reading of the following description in conjunction with the appended drawings.

BRIEF DESCRIPTION OF THE DRAWINGS

FIG. 7 is a top plan view showing braking means for the manual input linkage portion of the control system.

DESCRIPTION OF THE PREFERRED EMBODIMENT

Figure 1:
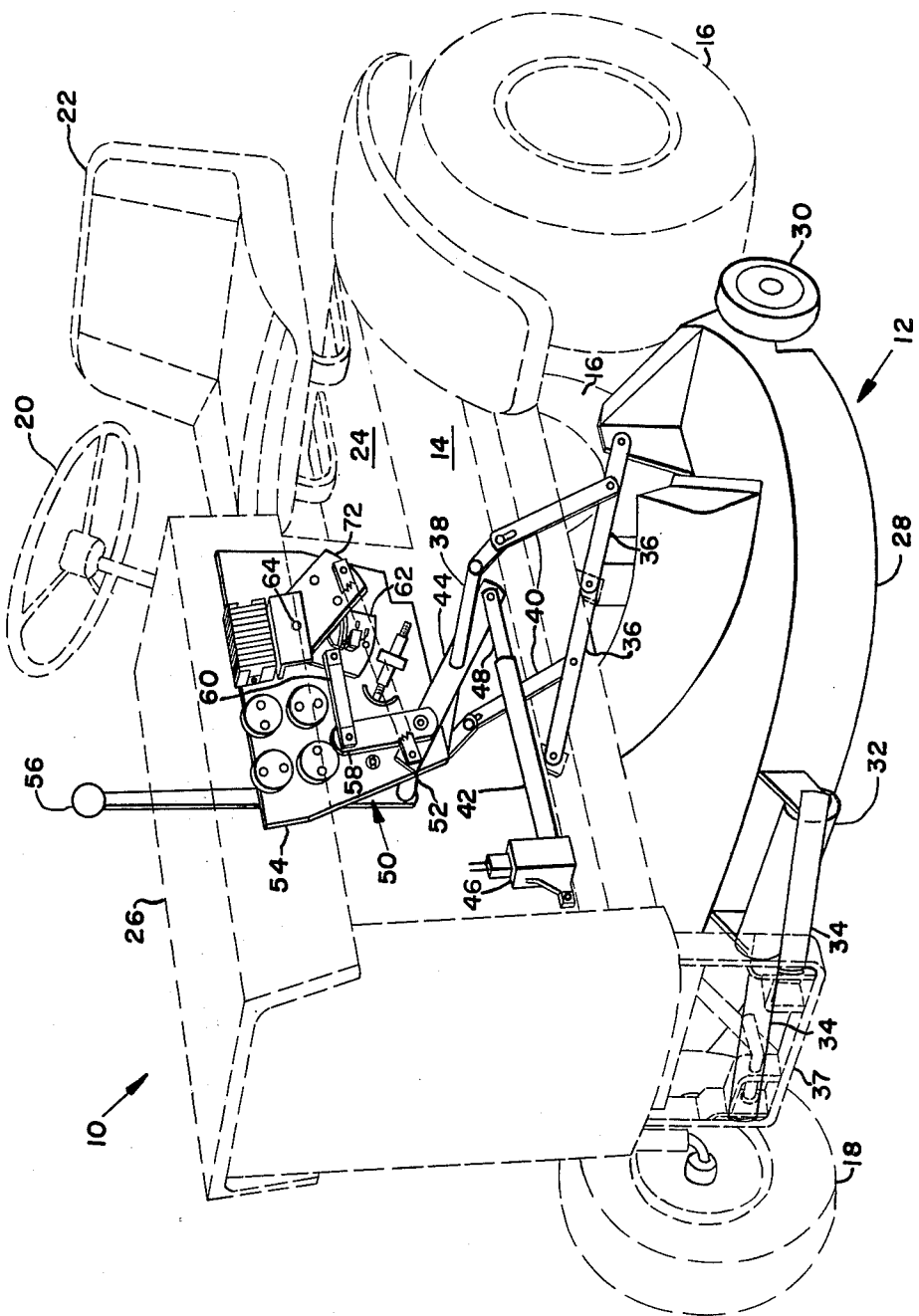
FIG. 1 is a perspective view taken from the left front of a lawn and garden tractor having an implement mounted thereon and embodying the control system of the present invention, the lawn and garden tractor being shown in phantom.

Referring now to the drawings, the control system of the present invention is here illustrated as being embodied in a tractor and implement combination, the tractor being indicated generally at 10 and the implement is here illustrated as a mower indicated generally at 12. It is to be understood, however, that the control system to be described hereinafter is equally applicable to control systems for moving other implements or controlled elements other than mowers.

The tractor includes a main frame or chassis 14 which is carried by rear traction wheels 16 and front steerable wheels, one of which is shown at 18. The front wheels 18 are steered through linkage including a steering wheel 20 located so as to be within easy grasp of an operator seated in a seat 22 mounted on a deck structure 24 at a location between the rear wheels 16. Enclosed by the usual shielding at the forward end of the tractor is an engine compartment 26.

The mower 12 is of conventional structure including a generally horizontal housing 28 which is located between the front and rear wheels 16 and 18 of the tractor 10 and having gauge wheels connected to the outer rear portion thereof, one of which is shown at 30, and having a non-scalping roller 32 centrally located at the forward end thereof. As is conventional, a plurality of mower blades (not shown) are located within the housing 28 and are drivingly connected by means (not shown) to the prime mover of the tractor. The mower 12 is suspended from the tractor 10 through means of front and rear pairs of connecting links 34 and 36, respectively, the forward links having their opposite ends respectively connected to the housing 28 adjacent the opposite ends of the roller 32 and to a bracket 37 located between the tractor front wheels 18, and the rear links 36 having their opposite ends respectively connected to the mower housing 28 at a location adjacent the rear end thereof and to respective brackets at the opposite sides of the tractor frame 14. The front and rear pairs of links are located so as to form a somewhat parallel linkage suspension for the mower.

A lift linkage is provided for raising and lowering the mower and includes a transverse rockshaft 38 which is journaled for rotation in the tractor frame 14 and has integral crank arms at its opposite ends which are respectively pivotally connected to the upper ends of a pair of lift links 40, the lower ends of the lift links 40 being respectively pivotally connected to the rear connecting links 36. For the purpose of selectively rotating the rockshaft 38 clockwise or counterclockwise, as viewed from the left side of the tractor, for respectively lowering and raising the mower, there is provided a linear actuator shown schematically at 42 which is pivotally connected between the tractor frame 14 and the lower end of a crank arm 44 extending crosswise to and fixed integrally with the rockshaft 38. The linear actuator 42 is of a type generally similar to that disclosed in U.S. Pat. No. 2,424,492 issued on July 22 1947 to Morris and includes a reversible electric motor 46 which is drivingly connected to a rod 48 for reciprocating or shifting the latter rearwardly and forwardly respectively in response to the electric motor being driven in forward and reverse directions, the directions of the motor being arbitrarily chosen.

Indicated generally at 50 is a control system for controlling the operation of the electric motor 46 in a manner to be described below. The control system 50 is located in an upper area of the tractor so as to be free from interference with the mower drive and mower suspension. The system 50 includes a transverse input shaft 52 that is rotatably mounted in a vertical mounting plate or pedestal 54 and has a hand lever 56 fixed to its right end and a crank arm 58 fixed to its left end. The opposite ends of a motion-transfer link 60 are respectively pivotally connected to the upper end of the crank arm 58 and to an intermediate location of a switch support arm or member 62, the support arm 62 being pivotally mounted on a transverse pin 64 having opposite ends respectively mounted in the plate 54 and a depending leg of an angle bracket 66, which is fixed to the plate 54. Fixed side-by-side to the left face of the support arm 62 and cooperating therewith to form switch means are inner and outer control switches 67 and 68, respectively including respective switch elements 70 and 71. The switches 67 and 68 are of a conventional type constructed such that the elements 70 and 71 are biased towards respective normally open positions and are selectively movable away from these positions to respective closed positions.

A cam support arm or member 72 is pivotally mounted on the pin 64 at a location axially adjacent the switch support arm 62, it being here noted that the arms 62 and 72 are identical and thus interchangeable. Mounted on the right face of the cam support arm 72 is an arcuately shaped cam 74 which cooperates with the arm 72 to form cam means, the cam 74 having a cam surface, generally indicated at 76. The outer ends of the switch elements 70 and 71 are respectively defined by rollers 77 and 78 positioned for operative engagement by portions of the cam surface 76. Specifically, the cam surface 76 defines a first section for controlling the switch 67, the section, as viewed in FIG. 4, including a relatively long left actuating portion 79 formed at a first radius about the axis of the pin 64 and a relatively long right relief portion 80, which is formed at a lesser radius about the pin 64 than the portion 79 is formed. A short inclined portion 81 joins the portions 79 and 80.

Likewise, the cam surface 76 defines a second section for controlling the switch 68, the section including relatively long left and right relief and actuating portions 82 and 83 respectively formed at the same radii about the axis of the pin 64 that the right and left surface portions 80 and 79 of the first section are formed. A relatively short inclined portion 84 joins the portions 82 and 83.

Figure 4:
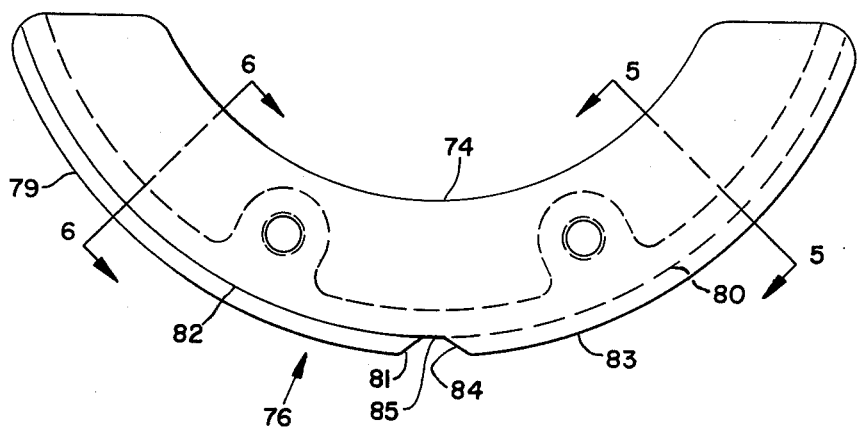
FIG. 4 is a left side view of the cam for actuating the two control switches of the electric circuit.
Figure 6:
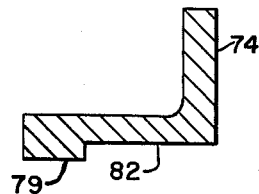
FIG. 6 is a sectional view taken along the line 6—6 of FIG. 4.
Figure 5:
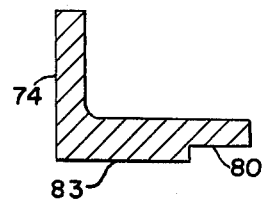
FIG. 5 is a sectional view taken along the line 5—5 of FIG. 4.

As viewed in FIG. 4, the relief portions 80 and 82 of the cam surface 76 have inner end portions which are overlapped in the central portion of the surface 76, as at 85. When the control system 50 is in a neutral or deactivated condition, the switch means and cam means bear a neutral angular relationship to each other wherein the arms 62 and 72 are disposed so as to bear the same angular relationship to the pin 64 and the switches 67 and 68 are disposed such that their respective element rollers 77 and 78 are respectively located adjacent to, but out of contact with the overlapped inner end portions of the relief portions 80 and 82 of the cam surface 76. Clockwise movement of the arm 62 relative to the arm 72 will then result in the roller 77 being engaged by the incline 81 and "lifted" onto the actuating surface portion 79 resulting in the element 70 being closed while counterclockwise movement of the arm 62 relative to the arm 72 will result in the roller 78 being engaged by the incline 84 and "lifted" onto the actuating surface portion 83 resulting in the element 71 being closed.

Figure 2:
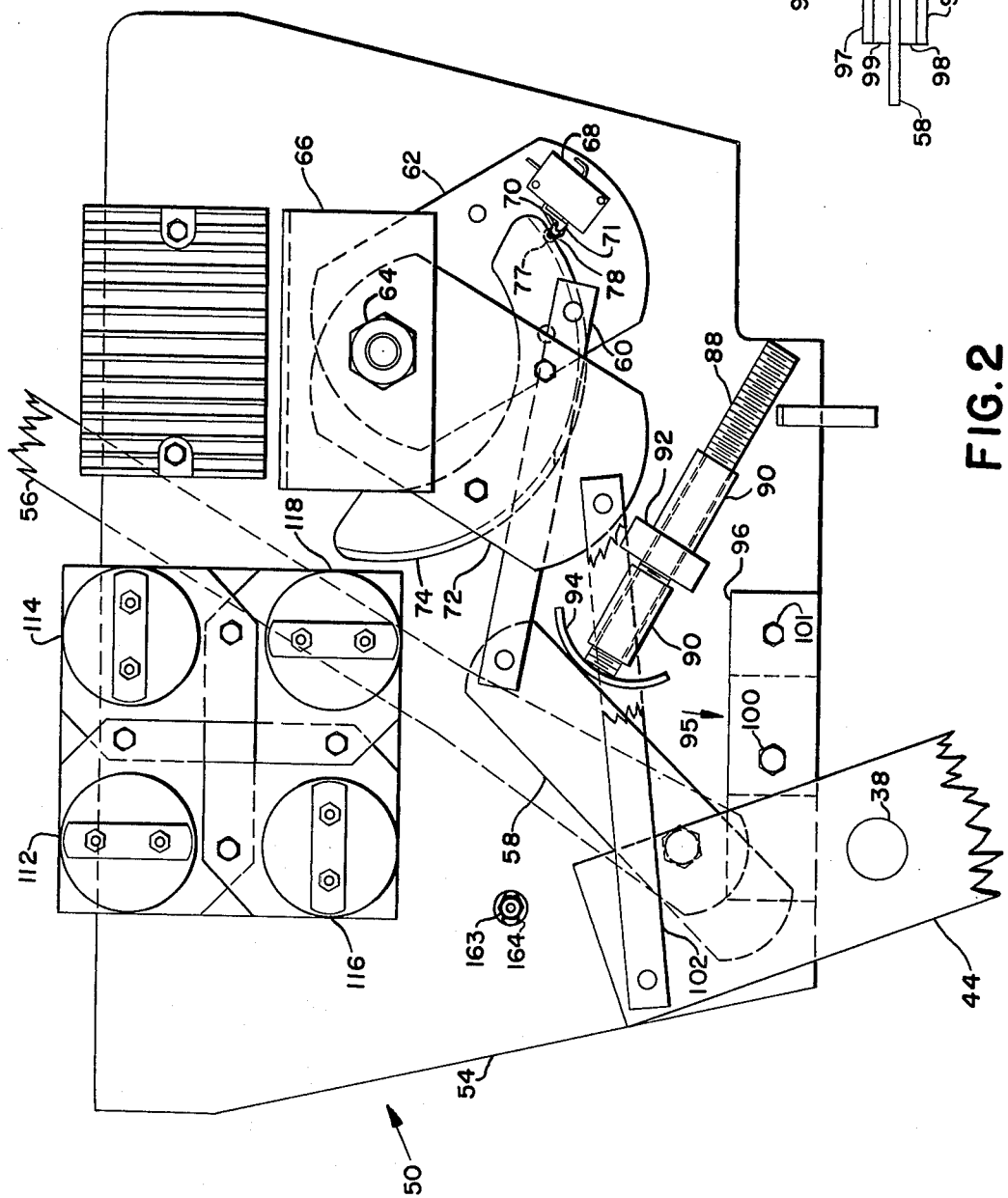
FIG. 2 is a left side view of the control system.

Thus, as viewed in FIG. 2, the switches 67 and 68 are respectively open and closed. If the switch support arm 62 is rotated clockwise from its position shown in FIG. 2, the switches 67 and 68 will respectively remain in their open and closed position until such time that the roller 78 travels radially inwardly on the inclined portion 84 to the cam surface portion 82. The arms 62 and 72 will then bear said neutral angular relationship to each other. Thus, it will be appreciated that the desired operating conditions of the switches 67 and 68 may be obtained by movement of the hand lever 56.

For limiting the counterclockwise movement of the switches 67 and 68 relative to the cam 74, there is provided a stop for limiting vertical travel of the mower. The stop comprises a threaded rod 88 disposed in a pair of axially aligned upwardly and forwardly inclined tubular receptacles 90. A ring-like operator 92 is threaded on the rod and is located between the tubular receptacles 90. Secured to the forward end of the rod 88 is an arcuate stop pad 94 disposed for limiting the counterclockwise movement of the crank arm 58. Thus it will be appreciated that rotation of the operator 92 in a first direction will cause forward movement of the rod 88 and stop pad 94 while reverse rotation of the operator 92 will cause rearward movement of the rod 88 and stop pad 94. A Belleville washer (not shown) may be interposed between the operator member 92 and one of the receptacles 90 for applying a slight pressure to the operator member 92 for preventing the latter from being rotated by vibrations and the like.

In order that the lever 56 will remain in any position to which it is moved, there is provided a brake means 95 which operates on the lower end of the link 58. Specifically, the brake means 95 includes a pair of strap-like members 96 and 97 (FIG. 7) respectively having spaced parallel forward ends to which brake pads 98 and 99 are fixed in sandwiching relationship to the lower end of the link 58. The forward ends of the members 96 and 97 are held together by a brake pressure adjusting bolt 100 and the rearward ends of the members are fixed together by a bolt 101.

A follow-up linkage is provided for acting in response to the actuation of the rockshaft 38 by the electric motor 46 for returning the cam to an intermediate position relative to the switches 67 and 68 whereat the rollers 77 and 78 are both located at the respective relief portions of the first and second cam sections, the switches 67 and 68 then being in their normal open positions. This operation is accomplished through means of a follow-up link 102 having opposite ends respectively pivotally connected to the lower end of the cam support arm 72 and the upper end of the crank arm 44.

Figure 3:
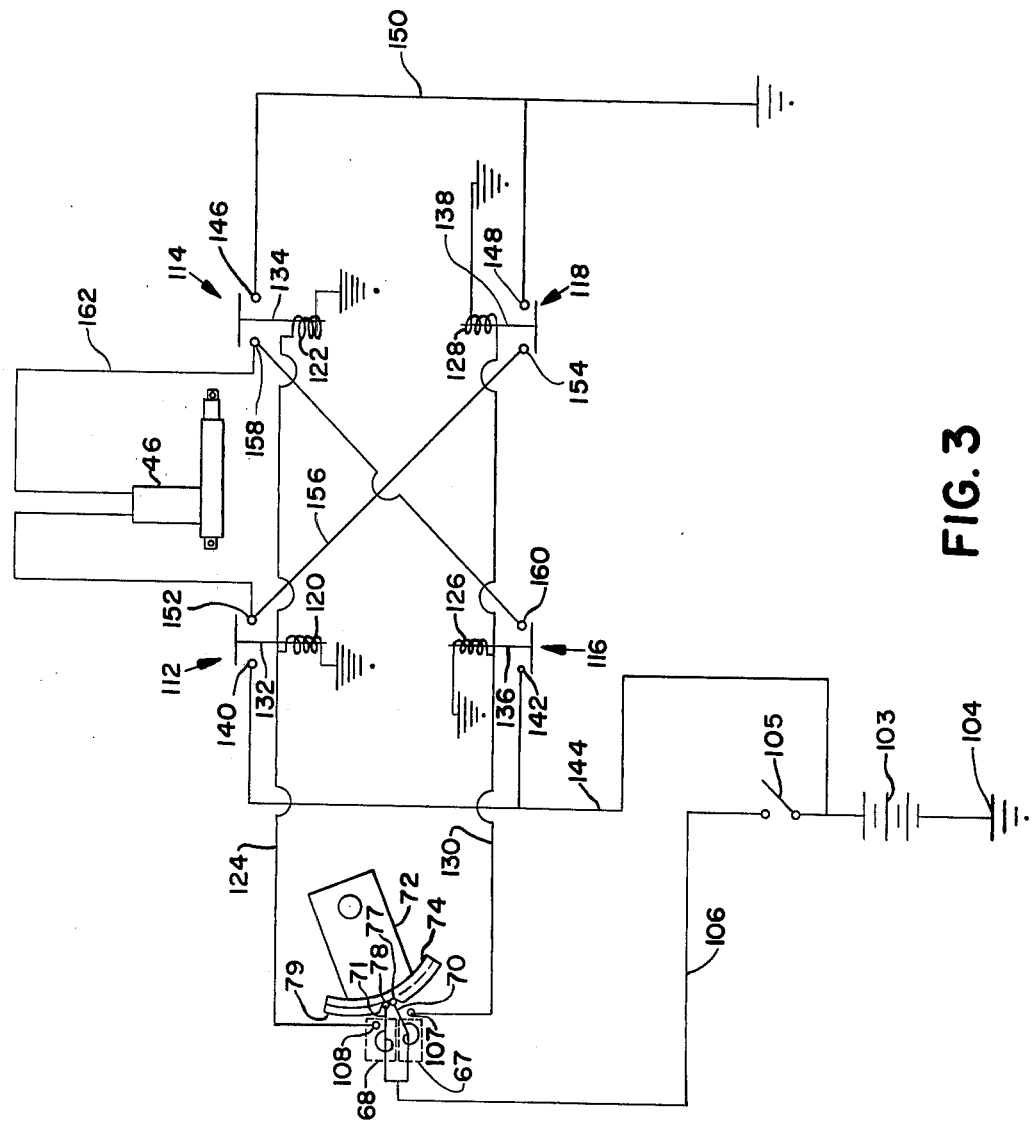
FIG. 3 is a schematic view of the electric circuit embodied in the control system for controlling the electric motor.

Referring now to FIG. 3, therein is shown a schematic representation of the electric circuitry for operating the electric motor 46 of the linear actuator 42, the circuitry embodying the control switches 67 and 68. The electric circuit includes a source of electrical energy here shown as a battery 103 having a first terminal connected to ground, as at 104, and having a second terminal connected to a first contact of an ignition switch 105 of the "on-off" type. A second contact of the switch 105 is connected to the switch elements 70 and 71 of the switches 67 and 68 through means of a line 106. The switches 67 and 68 respectively include contacts 107 and 108, the switch elements 70 and 71 being biased away from engagement with the contacts 107 and 108. The switches 67 and 68 form part of a control circuit and act to control the operation of reversing switch means located in a power circuit. The reversing switch means includes four normally open solenoid-operated switches 112, 114, 116 and 118, respectively. The switches 112 and 114 respectively include solenoid coils 120 and 122 which are connected at one of their ends in series with the contact 108 of the switch 68 through means of a line 124 while the switches 116 and 118 respectively include solenoid coils 126 and 128 having one of their ends connected in series with the contact 107 of the switch 67 through means of a line 130. The remaining ends of each of the solenoid coils are connected to ground. Respectively extending within the solenoid coils 118, 120, 126 and 128 are plunger portions of switch elements 132, 134, 136 and 138, respectively. The solenoid switches 112 and 116 include respective first contacts 140 and 142 connected to the battery 103 through means of a line 114, bypassing the ignition switch 105, and the solenoid switches 114 and 118 respectively include first contacts 146 and 148 connected to ground through means of a line 150. The solenoid switches 112 and 118 respectively include second contacts 152 and 154 connected to each other and to a first terminal of the motor 46 through means of a line 156 while the solenoid switches 114 and 116 respectively include second contacts 158 and 160 which are connected to each other and to a second terminal of the motor 46 through means of a line 162. Thus, it will be appreciated that with the contacts 140 and 142 of the switches 112 and 116 connected to the battery 103, subsequent closing of the switch 67 so as to energize the contact 107 will result in the closing of the switch elements 136 and 138 thus completing a circuit in a first direction through the motor 46. If the switch 68 is instead closed so as to energize the contact 108, the solenoid coils 132 and 134 will be energized to cause the closing of the switch elements 136 and 138 which completes a circuit in the reversed direction through the motor 46.

In order to prevent the motor 46 from being actuated in a direction tending to drive the actuator rod 48 forwardly after the latter has bottomed out, there is provided an adjustable stop 163 in the form of a bolt located in a fore-and-aft extending slot 164 positioned in the pedestal 54 so as to be in the path of movement of the link 58.

The operation of the control system 50 is as follows. With the mower in a cutting position as shown in FIG. 1, the switch support arm 62 and the cam support arm 72 will normally occupy the same angular position relative to the pin 64, the switches 67 and 68 then being so positioned relative to the cam 74 that their switch elements are in their normal open positions. The rollers 77 and 78 of the switch elements 70 and 71 will then be respectively adjacent to the inner end portions of radially inner cam surface portions 80 and 82 and the elements 70 and 71 will then be disposed in open positions away from the contacts 107 and 108. Accordingly, the motor 46 will be de-energized.

To energize the motor 46 so as to cause the mower to be raised to its transport position, the operator need only to push forwardly on the handle 56 to move it from its position shown in FIG. 2 to the position shown in FIG. 1. This movement of the lever 56 is transmitted to the switch support arm 62 by means of the input shaft 52, crank arm 58 and link 60 to cause the arm 62 to be swung clockwise relative to the cam support arm 72 to establish the relative positions of the arms 62 and 72 shown in FIG. 1. This movement of the arm 62 results in the roller 77 at the end of the switch element 70 riding upon the left cam surface portion 79 to effect closing of the switch element against the contact 107 to thus effect completion of a circuit to the solenoid coils 126 and 128 resulting in the energization of the latter and the consequent closing of the switch elements 136 and 138 to complete a circuit through the motor 46 in a direction for driving it fowardly. As the motor rotates in its forward direction, the rod 48 of the linear actuator 42 will move rearwardly causing the rockshaft 38 to be rotated counterclockwise to in turn cause a raising force to be exerted on the lift links 40 to thus accomplish lifting of the mower. Concurrently with the counterclockwise motion of the rockshaft 38, the upper end of the crank arm 44 will move forwardly and will act through the follow-up link 102 to rotate the cam support arm 72 clockwise about the pivot pin 64. This movement will continue until the cam surface 76 has moved sufficiently far that the overlapped inner end portions 80 and 82 are adjacent the rollers 77 and 78 of the switch elements 70 and 71 so that the latter are permitted to return to their normal open positions. The solenoid coils 126 and 128 will then be de-energized and switch elements 136 and 138 will move to their normal open positions.

If the operator then wants to return the mower to the depth it was at prior to his raising the mower, he need only to pull back on the hand lever 56 until the crank arm 58 comes into contact with the stop pad 94 of the adjustable cutting depth stop mechanism. It will be appreciated that immediately upon the operator moving the switch support arm 62 in the counterclockwise direction, the roller 78 of the switch element 71 will move radially outwardly on the cam surface portion 83, thus urging the element 71 into engagement with the contact 108 to complete a circuit to the solenoid coils 120 and 122 to thus energize them and cause the switch elements 132 and 134 to be moved to their closed positions. A circuit is then completed to the electric motor 46 for driving the latter in its reverse direction causing the rod 48 of the linear actuator 42 to retract to effect clockwise rotation of the rockshaft 38 and consequent lowering of the mower through means of the lift links 40. The clockwise rotation of the rockshaft 38 will be transferred through the upper end of the crank arm 44 to the follow-up link 102 to cause the cam support arm 72 to be swung counterclockwise about the pin 64 to again bring the cam surface 76 into a position wherein it is of contact with the rollers 77 and 78 of the switch elements 70 and 71 to again permit the latter to return to their normal open positions, thus de-energizing the solenoid coils 120 and 122 resulting in the switch elements 132 and 134 again moving to their normal open positions.

The hand lever 56 is limited in its forward movement by engagement of the link 58 with the adjustable stop 163 so as to prevent actuation of the motor 46 in a direction tending to drive the actuator rod 48 rearwardly after the rod has bottomed out.

If the operator desires to lift the mower to a position somewhere between the desired cutting height and transport, he may do so by pushing the lever 56 to some position intermediate those respectively illustrated in FIGS. 1 and 2. The brake means 95 will then act to retain the lever in this intermediate position, the pressure of the brake means being adjustable by merely tightening or loosening the nut of the adjusting bolt 100.

An important feature of the invention resides in the fact that the components for the feedback control system are all mounted on the vertical mounting plate or pedestal 54 which is located upwardly in the tractor and thus in an area wherein the control system will not interfere with the drive or lift mechanisms of the mower.

We claim:

1. In combination with a member movably mounted on a support structure and having a reversible electric motor means coupled thereto for effecting movement thereof in opposite first and second directions respectively in response to selective energization of a motor power circuit means to first and second modes of operation for respectively directing current at opposite polarity to the motor means, a control system for selectively energizing said power circuit means so as to effect operation of said motor means, comprising: a control switch means and a cam means respectively including first and second support arms mounted side-by-side for independent pivotal movement about a fixed axis; said control switch means being connected to said power circuit means and including first and second control switches removably fastened to said second support arm and being normally open for effecting a de-energized condition in said power circuit means and respectively including first and second switch element means respectively selectively actuatable to establish closed conditions in said first and second control switches for respectively effecting said first and second modes of operation in said power circuit; said cam means including cam surface means so disposed relative to said first and second switch element means that the latter remain uninfluenced when the control switch means and cam means bear a neutral angular relationship relative to each other, but are respectively engaged and closed immediately upon said neutral angular relationship being disturbed by angular movement of the switch means in first and second opposite directions relative to the cam means or respectively engaged by angular movement of said cam means in said second and first directions relative to said control switch means; one and the other respectively of said control switch means and cam element means respectively forming part of a manually operable linkage means and a follow-up linkage means; said manually operably linkage means being selectively shiftable for moving said one of said control switch means and cam means angularly in said first and second directions relative to the other so as to disturb said neutral angular relationship; and said follow-up linkage means being connected between said motor means and said other of said control switch means and cam means so as to cause the latter to follow the manually-caused movement of said one of said control switch means and cam means so as to restore said neutral angular relationship.

2. The combination defined in claim 1 wherein said first and second control switches are mounted side-by-side on said first support arm so that the respective first and second switch element means thereof are disposed at the same radial distance from said fixed axis; and said cam surface means including first and second elongate surfaces formed arcuately about said axis and disposed for respectively engaging and closing said first and second switch elements.

3. The combination defined in claim 1 wherein said first and second support arms are substantially identical so that they may be interchanged.

4. The combination defined in claim 2 wherein said first support arm forms part of said manually operable linkage and said second support arm forms part of said follow-up linkage.

5. The combination defined in claim 1 and further including a first manually adjustable stop means located for blocking movement of said manually operable linkage beyond a preselected position to which the manually operable linkage means may be moved to effect movement of the movably mounted member to a preselected position; said first stop means including a threaded rod supported by spaced bearing means for axial shifting movement; and a threaded actuator ring received on the rod and located between the bearing means and being rotatable to effect axial movement of said rod relative to said bearing means.

6. The combination defined in claim 5 wherein said movable member is a mower and said first stop means being located to preselect the cutting height of said mower.

7. The combination defined in claim 5 and further including a second manually adjustable stop means mounted for preventing movement of said manually operable linkage means beyond a preselected position in a direction away from said first stop means; said motor means including a reciprocable output rod; said second stop means being located such that when said manually operable linkage means is engaged therewith and said switch means and cam means are in said neutral angular relationship relative to each other, said output rod will be at the end of its stroke, the second stop means thereby acting to prevent actuation of the motor means in a direction tending to move its output rod beyond the end of the stroke of the rod.

8. The combination defined in claim 7 and further including pressure-adjustable friction pad means arranged in sandwiching relationship to said manually operable linkage means so as to frictionally retain the latter in preselected positions between those wherein it is in engagement with said first and second stop means.

9. The combination defined in claim 1 where power circuit includes reversing switch means comprising first, second, third and fourth normally open, electrically responsive switches; said first electrically responsive switch being connected in series between a source of electrical power and in first terminal of said motor means and said second electrically responsive switch means being connected in series between ground and a second terminal of said motor means; said third electrically responsive switch being connected in series between said source of electrical power and said second terminal of said motor means; said fourth electrically responsive switch means being connected in series between said ground and second terminal of said motor means; said first and second electrically responsive switches respectively including first and second electrically responsive means connected to said first control switch so as to be energized to effect closure of said first and second electrically responsive switches in response to closure of said first control switch; and said third and fourth electrically responsive switches respectively including third and fourth electrically responsive means connected to said second control switch so as to be energized to effect closure of said third and fourth electrically responsive switches in response to closure of said second control switch.

* * * * *